US012766776B2

(12) United States Patent
Baldisserri et al.

(10) Patent No.: US 12,766,776 B2
(45) Date of Patent: Oct. 20, 2026

(54) CONTINUOUS CYCLE SYSTEMS AND METHODS FOR MOULDING SINGLE OBJECTS FROM PLASTIC MATERIAL

(71) Applicant: SACMI COOPERATIVA MECCANICI IMOLA SOCIETA' COOPERATIVA, Imola (IT)

(72) Inventors: Davide Baldisserri, Imola (IT); Stefano Bergami, Castel San Pietro Terme (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 138 days.

(21) Appl. No.: 18/007,328

(22) PCT Filed: Sep. 22, 2021

(86) PCT No.: PCT/IB2021/058624
§ 371 (c)(1),
(2) Date: Jan. 30, 2023

(87) PCT Pub. No.: WO2022/064373
PCT Pub. Date: Mar. 31, 2022

(65) Prior Publication Data

US 2023/0271370 A1 Aug. 31, 2023

(30) Foreign Application Priority Data

Sep. 23, 2020 (IT) ........................ 102020000022423

(51) Int. Cl.
*B29C 48/92* (2019.01)
*B29C 48/255* (2019.01)
(Continued)

(52) U.S. Cl.
CPC .......... *B29C 48/92* (2019.02); *B29C 48/2552* (2019.02); *B29C 48/387* (2019.02);
(Continued)

(58) Field of Classification Search
CPC ... B29C 48/92; B29C 48/2552; B29C 48/387; B29C 48/62; B29C 48/68;
(Continued)

(56) References Cited

U.S. PATENT DOCUMENTS 7,083,321 B2 8/2006 Grunschloss
8,202,076 B2 6/2012 Parrinello et al.
(Continued)

FOREIGN PATENT DOCUMENTS

CN 86105207 A 8/1987
CN 1090548 A 8/1994
(Continued)

OTHER PUBLICATIONS

Japanese Office action issued on Apr. 18, 2024 in Japanese Application No. 2023-518367 (copy attached with English translation), 20 pages.
(Continued)

*Primary Examiner* — Xiao S Zhao
(74) *Attorney, Agent, or Firm* — Chrisman Gallo Tochtrop LLC

(57) ABSTRACT

A continuous cycle system for moulding single objects from plastic material, including: an extruder including a cylinder extending along a longitudinal axis (L), a screw rotating inside the cylinder about the longitudinal axis (L), the screw having a core and a thread externally coupled to the core and heaters coupled to the cylinder; a moulding machine, configured to receive as input the flow of liquid plastic material from the extruder and including a plurality of moulds, each
(Continued)

having a first and a second half mould movable relative to each other between an open position and a closed position.

13 Claims, 7 Drawing Sheets

(51) Int. Cl.
*B29C 48/375* (2019.01)
*B29C 48/62* (2019.01)
*B29C 48/68* (2019.01)

(52) U.S. Cl.
CPC .............. *B29C 48/62* (2019.02); *B29C 48/68* (2019.02); *B29C 2948/92104* (2019.02); *B29C 2948/92161* (2019.02)

(58) Field of Classification Search
CPC ........... B29C 2948/92104; B29C 2948/92161; B29C 2948/92209; B29C 2948/92542; B29C 2948/9259; B29C 2948/926; B29C 2948/92657; B29C 2948/92704; B29C 48/0017; B29C 48/37; B29C 48/66; B29C 48/686; B29C 48/0011
See application file for complete search history.

(56) References Cited

U.S. PATENT DOCUMENTS

| | | | | |
|---|---|---|---|---|
| 11,067,504 | B2 | 7/2021 | Bosi | |
| 12,005,618 | B2 | 6/2024 | Fazziani et al. | |
| 2001/0009307 | A1* | 7/2001 | Abrams | B29B 7/7485 473/481 |
| 2002/0131322 | A1* | 9/2002 | Grunschloss | B29C 48/688 366/80 |
| 2004/0085852 | A1 | 5/2004 | Grunschloss | |
| 2007/0114697 | A1* | 5/2007 | Robinson | B29C 45/2737 425/573 |
| 2009/0175976 | A1 | 7/2009 | Parrinello et al. | |
| 2012/0070615 | A1* | 3/2012 | Shi | B29C 48/08 528/308.2 |
| 2013/0052296 | A1 | 2/2013 | Jeon et al. | |
| 2013/0115325 | A1* | 5/2013 | Matteo | B29C 48/09 425/533 |
| 2016/0109867 | A1 | 4/2016 | Wada et al. | |
| 2020/0078998 | A1 | 3/2020 | Lawless, III et al. | |
| 2020/0131322 | A1 | 4/2020 | Nodono et al. | |
| 2021/0237320 | A1 | 8/2021 | Fazziani et al. | |

FOREIGN PATENT DOCUMENTS

| | | | | | |
|---|---|---|---|---|---|
| CN | 1233971 | A | | 11/1999 | |
| CN | 2827693 | Y | | 10/2006 | |
| CN | 101466516 | | | 6/2009 | |
| CN | 101848799 | A | | 9/2010 | |
| CN | 103025504 | A | | 4/2013 | |
| CN | 103496147 | A | | 1/2014 | |
| CN | 103770310 | A | | 5/2014 | |
| CN | 107750204 | A | | 3/2018 | |
| CN | 207105569 | U | | 3/2018 | |
| CN | 109804014 | A | * | 5/2019 | B29C 49/0005 |
| CN | 111055467 | | | 4/2020 | |
| DE | 199 28 870 | A1 | | 1/2001 | |
| DE | 101 30 759 | A1 | | 9/2002 | |
| EP | 0 838 326 | A1 | | 4/1998 | |
| EP | 1 194 278 | A | | 4/2002 | |
| EP | 2585273 | A1 | * | 5/2013 | B29C 48/09 |
| JP | H04168027 | | | 6/1992 | |
| JP | H05212773 | | | 8/1993 | |
| JP | H07285163 | | | 10/1995 | |
| JP | 2003136583 | A | | 5/2003 | |
| JP | 2009226766 | A | | 10/2009 | |
| JP | 2010005949 | A | | 1/2010 | |
| JP | 2010-082990 | A | | 4/2010 | |
| JP | 2017-035801 | A | | 2/2017 | |
| JP | 2018521878 | A | | 8/2018 | |
| TW | 201945156 | | | 12/2019 | |
| WO | 01/00383 | A1 | | 1/2001 | |
| WO | 2004/080684 | A1 | | 9/2004 | |
| WO | WO-2011161649 | A1 | * | 12/2011 | B29C 48/09 |
| WO | 2015/092644 | A1 | | 6/2015 | |
| WO | 2016/181361 | A1 | | 11/2016 | |
| WO | 2018/025100 | A1 | | 2/2018 | |
| WO | 2018/025150 | A1 | | 2/2018 | |
| WO | 2019/207420 | A1 | | 10/2019 | |

OTHER PUBLICATIONS

International Search Report and Written Opinion for corresponding International Application No. PCT/IB2021/058624 mailed Dec. 22, 2021.

1 Notice of Reasons for Refusal Patents Application 2023-518367 Feb. 18, 2025.

Office action issued in Taiwanese Patent Application No. 110135183, issued Dec. 27, 2024, 17 pages.

* cited by examiner

CONTINUOUS CYCLE SYSTEMS AND METHODS FOR MOULDING SINGLE OBJECTS FROM PLASTIC MATERIAL

CROSS-REFERENCE TO RELATED APPLICATIONS

This is a National Stage application of PCT international application PCT/IB2021/058624 filed on Sep. 22, 2021, which claims the priority of Italian Patent Application No. 102020000022423, filed, Sep. 23, 2020, which are incorporated herein by reference in their entireties.

TECHNICAL FIELD

This invention relates to a continuous cycle system for moulding single objects from plastic material. This disclosure also relates to an extruder for polymeric materials and to a method for extruding polymeric materials.

This disclosure addresses the sector of continuous cycle systems for moulding single objects from plastic material, such as, for example, bottle caps or parisons to be blow-moulded to form bottles.

The systems used for this purpose comprise an extruder designed to receive plastic material in raw form and to feed out a stream of plastic material in the liquid phase, and a moulding machine configured to receive as input the flow of liquid plastic material from the extruder. More specifically, this disclosure relates to systems in which the moulding machine works by compression or by injection-compression; alternatively, moulding machines which work by injection are also known in the prior art.

BACKGROUND ART

An example of a system for continuous-cycle production of plastic objects from plastic material using a compression moulding machine is described in patent document WO2018/025150A1, in the name of the present Applicant; another example of a system for continuous-cycle production of plastic objects from plastic material but using an injection-compression moulding machine is described in patent document WO2011161649A1. Other solutions regarding a continuous cycle system for moulding single objects from plastic material are provided by patent documents WO2019207420A1 and EP2585273A1, wherein examples of an injection molding system are illustrated.

As regards the extruders, it should be observed that the possible applications of an extruder are not limited merely to the continuous-cycle production of single objects from plastic material using moulding machines but typically include extrusion plants for making long parts (profiled or drawn) and extrusion-blow moulding plants where the extruder is coupled directly to a blow-moulding machine; an example of an extrusion-blow moulding plant is described in patent document WO2018025100, in the name of the present applicant. In this context, patent documents DE10130759A1 and EP1194278B1 describe extruders which are specifically designed for such applications, for extrusion plants for the production of long parts and for extrusion-blow moulding plants; these extruders have a barrier screw coupled to a fluted cylinder.

Other examples of extruders of this type are described, for example, in the document CN103496147A.

On the other hand, prior art extruders for applications with compression moulding machines and injection-compression moulding machines have different features; typically, the inside surface of the cylinder is smooth—that is, it is not fluted—especially in the zone where the plastic undergoes melting.

Generally speaking there is a need to increase the production speed of these systems. Another need typical of these systems is that to improve the quality of the plastic objects moulded. To achieve these goals, the efforts of the manufacturers of these systems are concentrated essentially on the moulding machines, to make them more efficient and sophisticated. However, the need remains to further improve the production capacity of the system and the quality of the objects moulded.

Moreover, there is also a need to improve the dependability of the extruders and to increase their working life.

DISCLOSURE OF THE INVENTION

This invention has for an aim to provide a continuous cycle system and method for moulding single objects from plastic material to overcome the above mentioned drawbacks of the prior art.

This aim is fully achieved by the system and method of this disclosure as characterized in the appended claims.

More specifically, the aim of this disclosure is to provide a continuous-cycle system and method for moulding single objects from plastic material to allow achieving a particularly high production speed.

Another aim of this disclosure is to provide a continuous-cycle system and method for moulding single objects from plastic material to allow making objects with a particularly high level of precision and quality.

This disclosure thus regards a system, preferably a continuous-cycle system, for moulding single objects from plastic material.

The objects may be, for example, bottle caps, capsules for the production of infusion beverages, disposable containers for sanitary devices, or other objects.

The system comprises an extruder. The extruder is designed to receive plastic material in raw form and to feed out a stream of plastic material in the liquid phase.

The extruder includes a cylinder which extends along a longitudinal axis between an inlet and an outlet. The extruder comprises a screw which rotates about the longitudinal axis, inside the cylinder. The screw has a core and a thread externally coupled to the core.

The extruder also includes heaters, coupled to the cylinder. In an embodiment, the heaters include a resistance system. In another embodiment, the heaters include electromagnetic inductors.

The system comprises a moulding machine designed to receive the stream of liquid plastic material from the extruder. The machine comprises a plurality of moulds, each having a first and a second half mould, which are movable relative to each other between an open position of the mould, to allow extracting the object from the mould, and a closed position of the mould, where they delimit a closed moulding space. In one or more embodiments, the moulding machine includes a metering unit, configured to separate from the stream of plastic material, predetermined quantities of plastic material forming respective charges to be inserted into corresponding moulds of the plurality of moulds. More specifically, the metering unit is provided in the embodiments in which the moulding machine is a compression moulding machine, whilst it is not provided in the embodiments in which the moulding machine is an injection moulding machine.

According to an embodiment, the metering unit includes a separation element, which is distinguished by a mere interruption of the flow of the plastic material, as occurs, for example, in the case of injection molding. In the case of compression molding or injection-compression molding, to which reference is made in the present invention, the extruder is configured to extrude a pasty (non-liquid) material which is subsequently separated from the plastic material rod to define a pasty dose that will be subsequently compressed. The separation element, in some embodiments, is a knife rotating around a fulcrum that periodically encounters the plastic material rod, to separate a portion of the material from the material rod to define the dose. In this case, the rotation period of the knife and the extrusion speed are synchronized to define the right amount of the dose to be provided.

Furthermore, in some embodiments, the metering unit comprises a transfer element, for transferring the dose from the extruder to the mold, in which the latter is compressed. Examples of transfer elements can be grippers, suction conveyors or other systems that are configured to take the dose from the separating (cutting) element and to transport it to the mold, where the dose is deposited before its compression. In other words, the metering unit provides a pick-up and positioning system, better known as pick and place device, which instead, in the case of injection, is not provided, as it is not necessary.

In one or more embodiments, the moulding machine includes an actuator assembly configured to compress each charge so that it occupies the moulding space of the respective mould. In compression machines, the actuator assembly includes hydraulic or mechanical actuators which move the half moulds towards and away from each other.

More specifically, in an embodiment, the moulding machine is a rotary, compression moulding or injection-compression moulding machine.

In at least one embodiment, the extruder screw is a barrier screw defining a feed section and a melting section which are spaced from each other along the longitudinal axis. More specifically, by barrier screw is meant a screw which has a single thread in a first section of it, close to the inlet (to define a single, first channel for receiving the plastic pellets from the hopper); the thread branches off into two to define a second channel, in addition to the first channel. Thus, the thread delimits two separate channels (forming the feed section and the melting section): one for the pellets not yet plasticized and one for the plasticized melt. In the proximity of a starting end of the barrier screw, the melt channel is smaller in size and the pellet channel is larger in size; then, proceeding along the axis, the melt channel becomes larger in size and the pellet channel smaller. This variation in channel size may be determined by a variation in the thread pitch or it may be determined by a variation in the diameter of the core. In the latter case, therefore, the core has a first section, with a first area, and a second section, longitudinally spaced from the first section and having a second area which is greater than the first area.

An example of a barrier screw is described in U.S. Pat. No. 6,705,752B2, incorporated herein by reference; it is understood that all the features of the barrier screw of patent document U.S. Pat. No. 6,705,752B2 can be applied to the screw of this embodiment.

In at least one embodiment, the cylinder includes, on an inside surface of it, a groove which extends longitudinally and which faces the melting section of the screw. Preferably, the screw is helical. In other embodiments, the groove may be made up of rings. Preferably, the groove is disposed transversely to the screw thread. Thus, the direction of the groove is opposite to the rotation direction of the screw.

It should be noted that an extruder like the one described in this disclosure (specifically, one including a barrier screw and groove inside the cylinder) allows obtaining a lower temperature of the outflowing melt for the same degree of plasticization. More specifically, the groove offers the melt a reduced friction path which allows the temperature of the melt to be reduced and puts a smaller load on the screw. This is preferable because it means less time is needed to cool the moulded object. A lower moulding temperature also has the advantage of reducing material shrinkage during cooling.

Preferably, the groove comprises a plurality of starts—that is to say, it comprises more than two ends.

Preferably, the groove on the cylinder also extends to the portion of the cylinder that faces the feed zone of the screw. More specifically, the groove may be helical, facing both the feed zone and the melting zone. Preferably, the groove has decreasing depth from the inlet to the outlet. The groove helps reduce friction (hence the mechanical power required by the screw) as the melt (or the small-sized pellets) passes from the feed section to the melting section and also prevents the pellets from sliding on the inside wall of the cylinder and rotating as one with the screw. At an inlet zone, this groove must be larger in size because the mass of pellets to be rotated relative to the cylinder is larger.

In at least one embodiment, the extruder cylinder comprises a plurality of grooves made on the inside surface of it, extending (at least partly) longitudinally and facing the melting section of the screw.

In an embodiment, the cylinder comprises a plurality of longitudinal grooves, parallel to the longitudinal axis, made on the inside surface of the cylinder and facing the melting section of the screw.

In an embodiment, the extruder comprises coolers; the coolers are located in a starting zone of the cylinder (near the inlet). Preferably, the coolers are controlled.

In an embodiment, the extruder comprises a mixer; the mixer is located in an end part of the extruder, near the outlet.

The pellets are fed from a hopper to an infeed part of the cylinder; preferably, there is no eccentric widened portion in the starting zone of the cylinder, which receives the pellets from the hopper.

In an embodiment, the extruder comprises a pushing device. The pushing device is configured to move the molten polymeric material fed by the screw to make it available to a moulding machine for making polymeric objects.

In an embodiment, the pushing device includes a pump; in this case, the molten polymeric material is fed continuously to the moulding machine, which is preferably a compression moulding machine. The function of the pump is to ensure that the material is expelled from the extruder and fed to the moulding machine at a constant rate; in effect, without a pump, the flow rate of the material would be fluctuating on account of the inherent features of the extruder; in some applications, such fluctuations are unacceptable and the use of a pump is therefore preferred.

In another embodiment, the pushing device includes an injection piston movable by translation in a chamber between a withdrawn position and an advanced position; in this case, the molten polymeric material is fed intermittently to the moulding machine, which is preferably an injection moulding machine. Whatever the case, the pushing device, where provided, includes a motor (preferably electric) configured to drive the pump or the injection piston.

In one or more embodiments, however, the pushing device is not provided and the molten material is fed from the outlet of the extruder directly to the machine which processes the material to make an object or other product. If the machine downstream of the extruder is a compression moulding machine, the absence of the pushing device results in less dimensional precision of the objects made; nevertheless, this lesser precision may be acceptable in some applications. In this context, if the machine downstream of the extruder is an injection moulding machine, the axial movement of the extruder screw may serve the function of pushing the material out of the extrusion cylinder (instead of the pushing device); in this case, after pushing a charge of material out of the cylinder, the screw must remain at the advanced position until the mould is completely full; this limits the speed of the machine but may nevertheless be acceptable in some contexts.

Also, in an embodiment, the machine downstream of the extruder is not a moulding machine but a lining machine; in this case, the pushing device is not necessary. More specifically, lining machines are machines that produce charges of polymeric material which are then applied to the inside of closures (for example, crown caps or jar lids) to improve closure seal. In these machines, fluctuations in the flow rate of the material fed by the extruder are tolerable. Such lining machines are described, for example, in patent documents WO04080684, EP0838326 and WO2015092644, incorporated herein by reference.

In an embodiment, the system comprises a group of sensors. The group of sensors includes one or more sensors configured to capture one or more of the following parameters:

p1) pressure of the molten polymeric material measured downstream of the pushing device;

p2) absorbed power of the motor that turns the extruder screw;

p3) speed of the extruder screw;

p4) absorbed power of the heaters;

p5) temperature of the molten polymeric material;

p6) electric power absorbed by the motor of the pushing device.

p7) extrusion cylinder temperature;

p8) speed at which the pushing device moves the molten polymeric material;

p9) pressure measured in an inlet zone of the pushing device;

p10) degree of plasticization inside or at the outlet of the cylinder;

p11) flow rate of the molten plastic material at the outlet of the cylinder.

With regard to parameter p10, it should be noted that the degree of plasticization may be measured with sensors of the kind described in patent document WO2016/181361A1, in the name of the present Applicant; it is implicitly understood that all the features of the sensors for measuring the degree of plasticization can be applied to one or more of the sensors of this disclosure.

Parameters p1-p11 may be monitoring parameters for the extruder; the term "monitoring parameter" is used to denote parameters whose values are monitored during the operation of the extruder, in order to identify any faults; for example, sudden variations in a monitoring parameter may indicate a change of plastic, meaning that the wrong material has been loaded. More generally speaking, however, the term "monitoring" indicates any parameter whose value is monitored.

Parameters p1-p11 may also be recipe parameters for the extruder; the term "recipe parameters" is used to denote parameters which must adopt predetermined values for every specific type of plastic and/or product made. It should be noted that a recipe parameter may itself also be a monitoring parameter if it must adopt a predetermined value and, at the same time, is monitored while the extruder is operating.

The system, or the extruder, comprises a processing unit (or control unit). Thus, in an embodiment, the sensor system is configured to measure values of one or more recipe parameters (including any of the parameters p1-p11 or a combination thereof). The processing unit is programmed to store a target value for the one or more recipe parameters and to perform a feedback control on the extruder to bring the one or more recipe parameters to, and hold them at, the target value. More specifically, the feedback control may be performed on the heaters by varying the electrical power absorbed by the heaters, and/or on a motor which drives the screw by varying the rotation speed of the screw, and/or on the pushing device (if provided) by varying the electrical power absorbed by the motor of the pushing device.

In an embodiment, the sensor system is configured to measure values of one or more monitoring parameters (including any of the parameters p1-p11 or a combination thereof). The processing unit is programmed to process a first value of the monitoring parameter, measured at a first time instant, and a second value of the monitoring parameter, measured at a second time instant, after the first time instant, and is programmed to generate alert data in response to a comparison between the first and the second value of the monitoring parameter. More specifically, the alert data are generated if a variation in the monitoring parameter in a predetermined length of time exceeds a tolerance value.

In an embodiment, the system comprises a first and a second group of heaters coupled to the cylinder at a first and a second position, respectively, and longitudinally spaced from each other; the processing unit may be connected to the first and the second group of heaters to control them independently of each other. This improves the accuracy of the control (specifically, the feedback control to satisfy the recipe).

The extruder comprises a motor, connected to the screw to transfer mechanical power to it by absorbing a first power (that is, electrical power that is converted into mechanical power).

The heaters are configured to transfer thermal power to the cylinder by absorbing a second power (that is, electrical power that is converted into thermal power).

The monitoring parameters may represent the first power (represented by parameter p2) and the second power (represented by parameter p4). In an embodiment, the processing unit is programmed to control the heaters (and/or the motor that drives the screw) in response to a comparison between the first power and the second power.

In an embodiment, in which the moulding machine is a compression or injection-compression machine, the first and the second half mould define an undercut when the mould is at the closed position, and the first half mould includes an extractor which is movable from a retracted position to an extracted position to move the moulded plastic object translationally to facilitate its detachment from the first half mould when the mould is at the open position. The mould preferably also includes a drawer which is movable along a direction perpendicular to the direction along which the first and second half moulds move, which is useful for making the undercut. It should be noted that combining the extruder of this disclosure with the moulding machine comprising an extractor and/or a drawer is a particularly ingenious one because extracting objects of this kind requires cooling them to a relatively low temperature and the low temperature of the plastic when it leaves the extruder, ensured precisely by extruders of this kind, reduces the necessary cooling time.

This disclosure also provides a method for moulding single objects from plastic material, preferably in a continuous cycle.

The method comprises a step of receiving plastic material in raw form and creating a stream of plastic material in the liquid phase, through an extruder. Preferably, the extruder is made according to one or more aspects of this disclosure.

In one or more embodiments, the method comprises a step of separating from the stream of plastic material predetermined quantities of plastic material, constituting respective charges.

In one or more embodiments, the method comprises a step of preparing a plurality of moulds, each having a first and a second half mould, which are movable relative to each other between an open position of the mould, to allow extracting the object from the mould, and a closed position of the mould, where they delimit a closed moulding space.

In one or more embodiments, the method comprises a step of compressing each charge in a corresponding mould of the plurality of moulds so as to force it to occupy the moulding space of the mould.

Preferably, the extruder screw is a barrier screw defining a feed section and a melting section which are spaced from each other along the longitudinal axis; in this context, the method comprises a step of moving molten plastic material in a groove made on the inside surface of the cylinder; the groove preferably extends longitudinally and faces the melting section of the screw.

In an embodiment, the method comprises a step of capturing values of at least one recipe parameter for the extruder; the at least one recipe parameter is selected from one of the parameters p1-p11. The method comprises a step of storing a respective target value for the recipe parameter. The method comprises a step of performing a feedback control on the heaters so as to bring the recipe parameter to, and hold it at, the target value.

In an embodiment, the method comprises a step of capturing at least one monitoring parameter; the at least one monitoring parameter is selected from one of the parameters p1-p11. The method comprises a step of processing a first value of the monitoring parameter, measured at a first time instant, and a second value of the monitoring parameter, measured at a second time instant, after the first time instant. The method comprises a step of generating alert data in response to a comparison between the first and the second value of the monitoring parameter.

More specifically, in an embodiment, the monitoring parameters represent a first power absorbed by the motor of the screw (parameter p2) and a second power absorbed by the heaters (parameter p4). The method comprises a step of processing the monitoring parameters and controlling the heaters and/or the motor that drives the screw in response to a comparison between the first power and the second power. For example, the processing unit of the extruder can control the heaters (and, if necessary, also the motor of the screw) so that the ratio between the first power and the second power is less than a preset value (for example, less than 30% or 40%); preferably, the ratio between the first power and the second power is between 20% and 30%). In this regard, it should be noted that the barrier screw and groove combination significantly reduces the friction of the material being rotated in the cylinder; thus, the mechanical power provided by the rotation of the screw is lower and the thermal power delivered by the heaters is higher compared to traditional extruders which are not provided with either barrier screw or groove.

In an embodiment, the molten plastic material moving in the groove follows a helical path; the helical path is preferably disposed transversely to the screw thread—that is, opposite to the rotation direction of the screw.

In an embodiment, the method comprises a step of mixing the stream of pressurized molten plastic material by means of a mixer (located downstream of the cylinder).

This disclosure also relates to an extruder. The extruder comprises a cylinder, extending along a longitudinal axis and having an inlet for receiving pellets of polymeric material, and an outlet for expelling molten polymeric material. The extruder may or may not be provided with grooves on the inside of it. The extruder comprises a screw, connected to a motor to drive it in rotation inside the cylinder about the longitudinal axis and to move the polymeric material from the inlet to the outlet, the motor being connected to the screw to transfer mechanical power to it by absorbing a first power. The screw may or may not be a barrier screw. The extruder comprises heaters, coupled to the extrusion cylinder and configured to transfer thermal power to the cylinder by absorbing a second power (parameter p4).

The extruder comprises a sensor system configured to capture monitoring parameters. The monitoring parameters may represent one or more of the parameters p1-p11 or a combination thereof. Preferably, the monitoring parameters represent the temperature of the cylinder (parameter p7) and/or the temperature of the molten plastic material at the outlet of the cylinder (parameter p5).

The extruder comprises a processing unit (which may coincide with the processing unit of the object moulding system); the processing unit is connected to the sensor system. The processing unit is configured to adjust the second power and/or the first power and/or the power of the pushing device as a function of a predetermined criterion and/or specifications received in connection with the object to be made. For example, the predetermined criterion and/or specifications received might regard the temperature of the molten plastic material; more specifically, the criterion might provide that the temperature of the molten plastic material be as low as possible, compatibly with a desired degree of plasticization. Thus, the processing unit makes the adjustment in response to, or as a function of, the temperature of the molten plastic material.

In an embodiment, the sensor system is configured to capture monitoring parameters representing a flow rate of the plastic material at the outlet of the cylinder (parameter p11) and the processing unit is programmed to adjust the first power and/or the power of the pushing device in response to the flow rate of the molten plastic material at the outlet of the cylinder.

The sensor system is configured to measure values of one or more recipe parameters (selected from the parameters p1-p11). The processing unit is programmed to store a respective target value for the recipe parameter and to perform a feedback control (for example on the heaters and/or on the motor that drives the screw and/or on the motor of the pushing device) to bring the recipe parameter to, and hold it at, the target value. In a first variant embodiment, the target value is communicated to the processing unit by a user; thus, the target value is an input data item for the control unit. In another variant embodiment, the target value of the recipe parameter is derived by the control unit. More specifically, the target value of the recipe parameter may be derived on the basis of, or in response to, the adjustment of the second power. Thus, concurrently with the adjustment of the second power, the processing unit derives the recipe parameter. In other words, the processing unit performs iterations as a function of requirements specified by the user and/or criteria programmed into the processing unit to identify a configuration which allows satisfying certain specifications; in this configuration, the recipe parameters adopt certain values that will be saved and used as target values and the heaters absorb a second power that will be set as adjustment value of the second power.

This disclosure also provides a method for extruding polymeric materials. Extrusion is performed by an extruder made according to one or more aspects of this disclosure. More specifically, extrusion is performed by a cylinder, which receives pellets of polymeric material at its inlet and is provided with heaters, and by a screw, which is connected to a motor which drives it in rotation inside the cylinder to move the polymeric material from the inlet towards an outlet of the cylinder.

The method for extruding comprises a step of capturing monitoring parameters representing the temperature of the extrusion cylinder and/or the temperature of the molten plastic material at the outlet of the extrusion cylinder. The method for extruding comprises a step of processing the monitoring parameters and adjusting the temperature of the extrusion cylinder (by adjusting the second power) in response to the temperature of the molten plastic material at the outlet of the extrusion cylinder. Thus, the processing unit adjusts the second power based on the values adopted by the monitoring parameters (specifically, the temperature of the molten plastic material). In other words, the processing unit performs iterations as a function of requirements specified by the user and/or criteria programmed into the processing unit to identify a configuration which allows satisfying certain specifications; the specifications and/or criteria are linked to the temperature of the cylinder and the temperature of the molten plastic material. Thus, once the second power which allows satisfying the specifications has been identified, the extrusion cylinder is adjusted in such a way as to remain at the second power.

In an embodiment, the method for extruding comprises the following steps: setting a target value for a recipe parameter; capturing values for the recipe parameter; performing a feedback control on the heaters so as to bring the recipe parameter to, and hold it at, the previously stored target value. The target value may be derived by the processing unit itself; in this case, the specifications and/or criteria are translated (at a pre-production stage) into target values of the monitoring parameters; alternatively, the target value may be set by a user based on their prior knowledge and based on the specifications of the object to be made. In both cases, during a production stage, the extruder will be controlled by feedback in such a way that the recipe parameters remain at the target value (previously calculated by the processing unit or set by the user).

BRIEF DESCRIPTION OF DRAWINGS

These and other features will become more apparent from the following description of a preferred embodiment, illustrated by way of non-limiting example in the accompanying drawings, in which.

DETAILED DESCRIPTION OF PREFERRED EMBODIMENTS OF THE INVENTION

Figure 1:
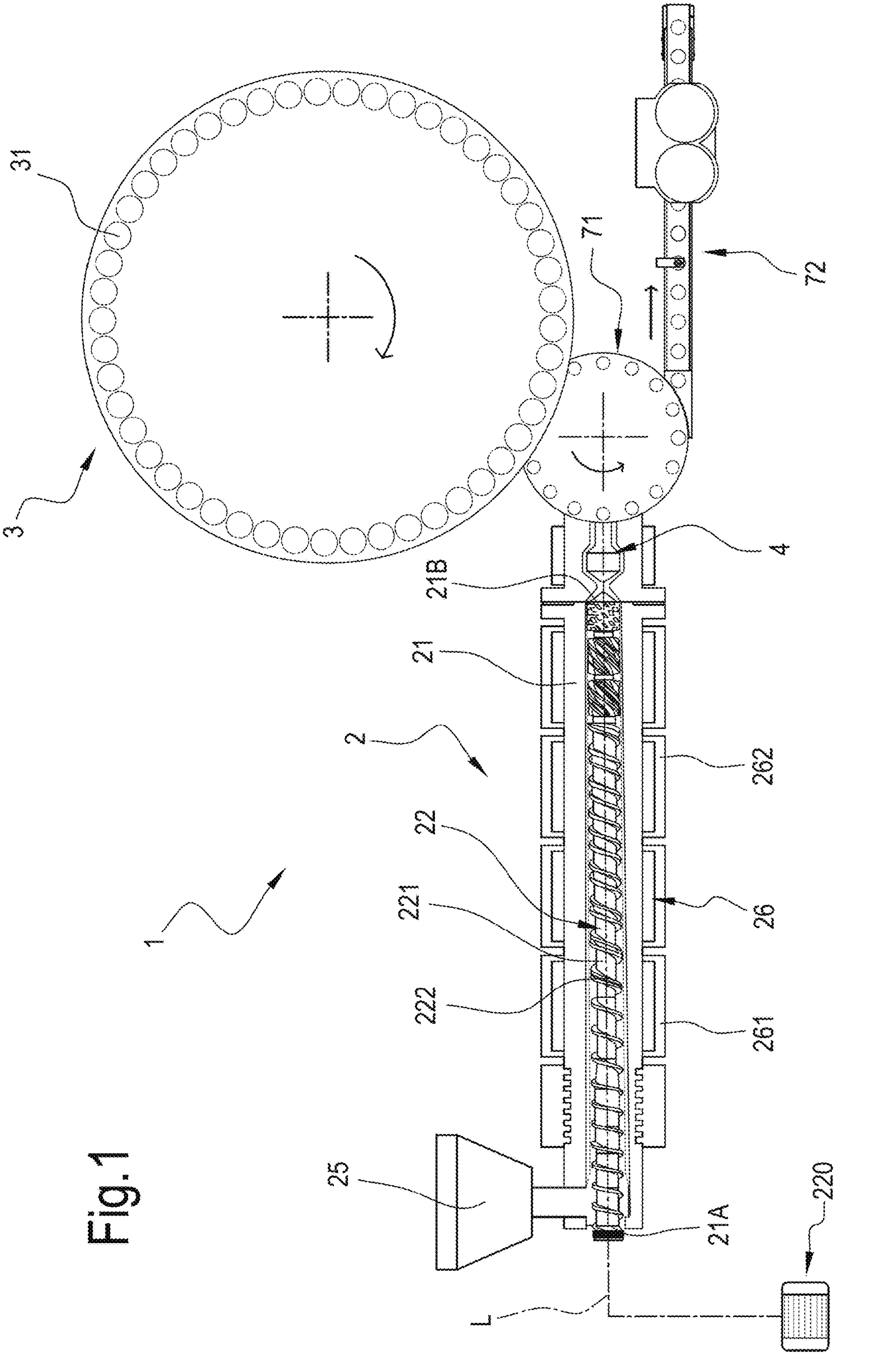
FIG. 1 illustrates a system for moulding objects according to this disclosure.
Figure 2:
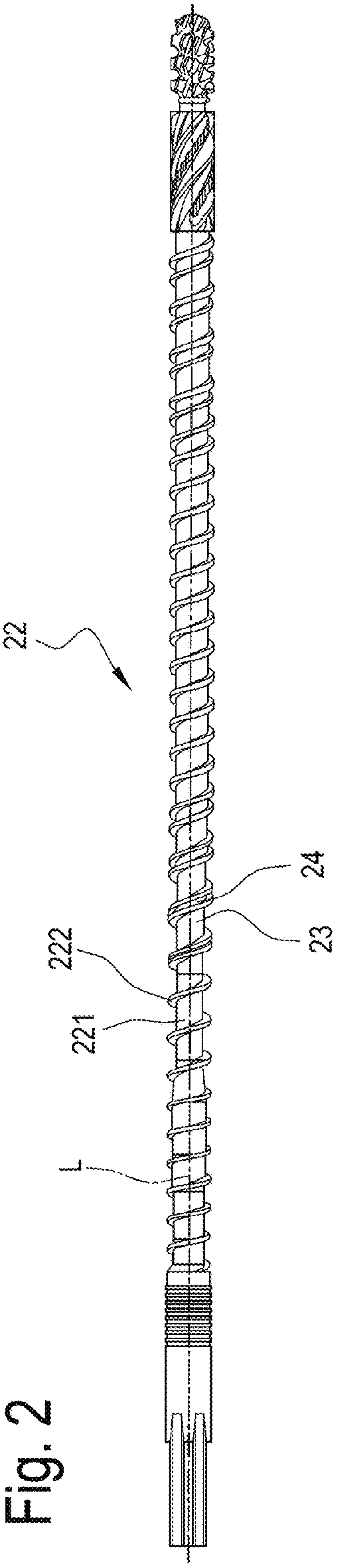
FIG. 2 illustrates an extruder screw of the system of FIG. 1.
Figure 3:
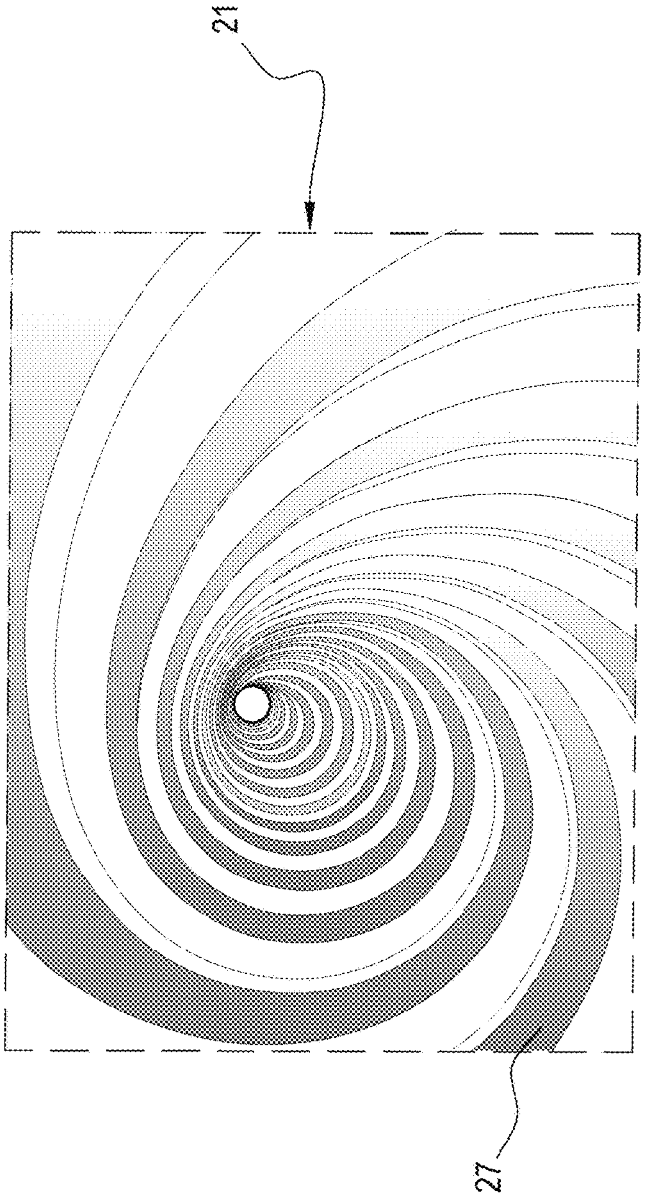
FIG. 3 illustrates the inside of the cylinder of the extruder of FIG. 1.
Figure 4:
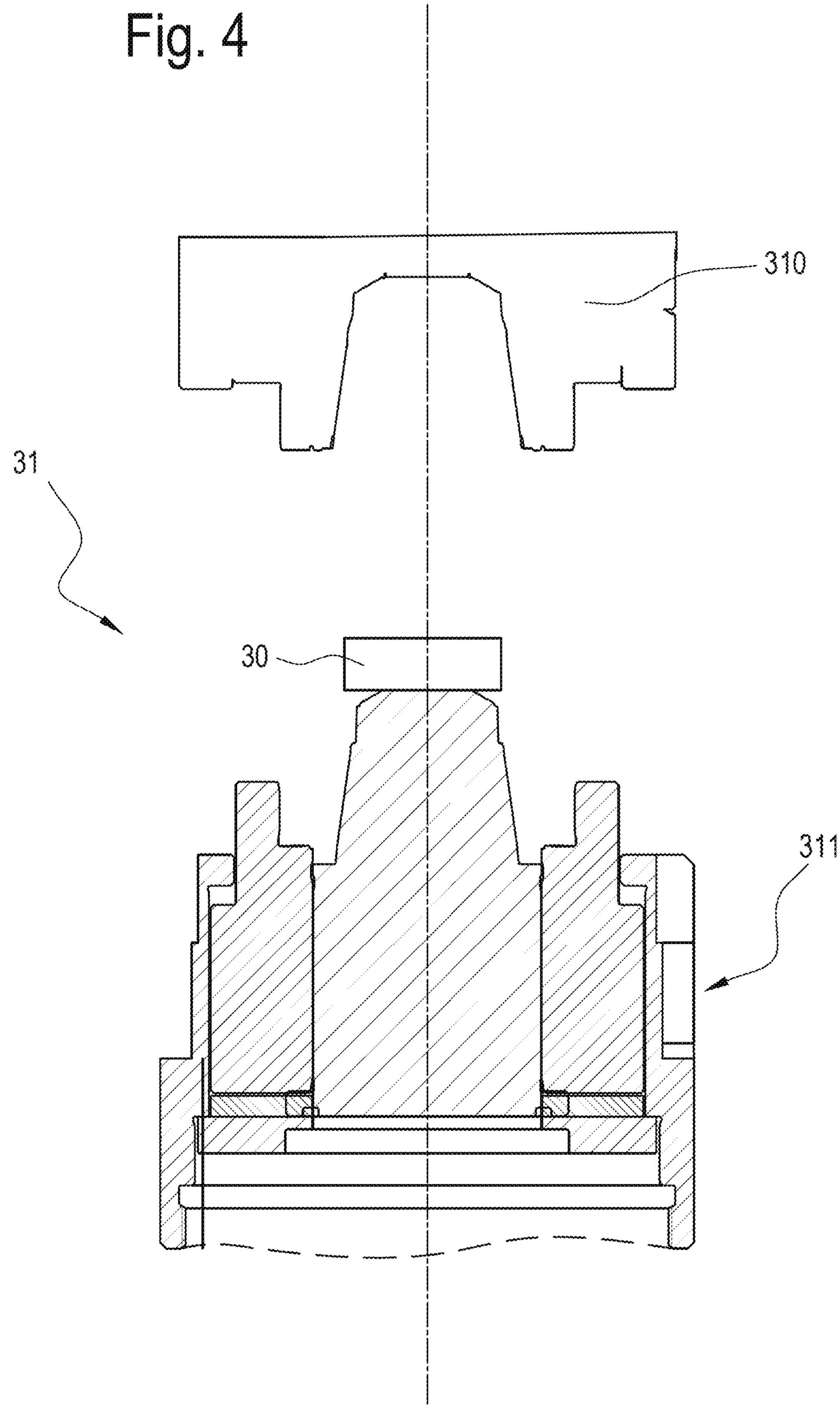
FIG. 4 illustrates a variant embodiment of a mould of a moulding machine of the system of FIG. 1, in an open configuration.
Figure 5:
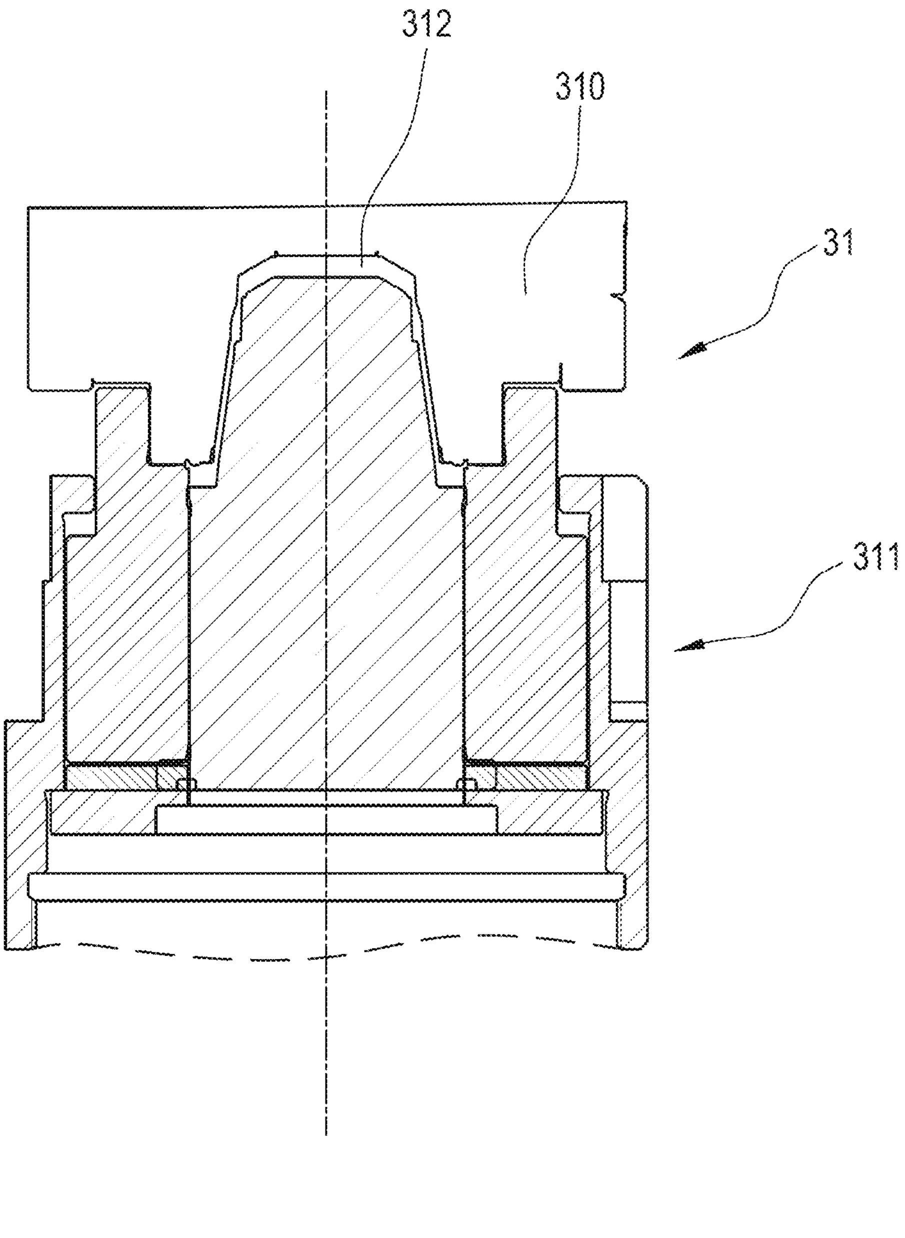
FIG. 5 shows the mould of FIG. 4 in a closed configuration.
Figure 6:
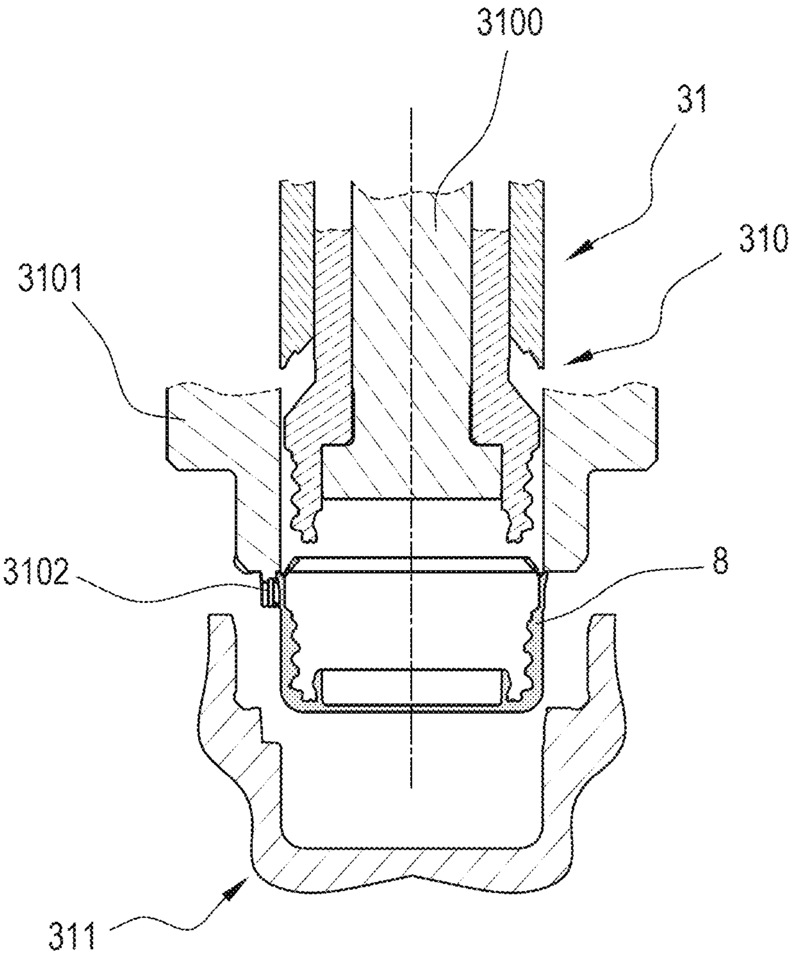
FIG. 6 illustrates another variant embodiment of the mould of the moulding machine of the system of FIG. 1.

With reference to the accompanying drawings, the numeral 1 denotes a system for moulding objects 8 according to one or more aspects of this disclosure.

The system 1 comprises an extruder 2. The extruder 2 includes a cylinder 21 made of conductive material (steel, for example) and a screw 22 which rotates inside the cylinder 21. The cylinder 21 extends along a longitudinal axis L between an inlet 21A and an outlet 21B. The screw 22 is rotatable about the longitudinal axis L. The screw 22 is connected to a motor 220 which drives it in rotation. The motor 220 preferably includes an electric motor.

The screw 21 comprises a core 221 and a thread 222 wound around the core 21. The screw 21 is preferably a barrier screw; the thread 222 thus delimits a feed section 23 and a melting section 24 which are spaced from each other along the longitudinal axis L.

The extruder 2 comprises a loading hopper 25 for feeding pellets to the inlet 21A of the cylinder 21.

The extruder 2 comprises heaters 26 located around the cylinder 21. The heaters 26 may include a first group of heaters 261 and a second group of heaters 262, longitudinally spaced apart and controllable independently of each other.

Preferably, an inside surface of the cylinder 21, facing the screw 22, is provided with a helical groove 27.

The system 1 comprises a moulding machine 3. In the embodiments illustrated, the moulding machine 3 is a compression moulding machine, configured to mould the objects 8 from respective charges 30 of thermoplastic or polymeric material. More specifically, the machine 3 comprises a plurality of moulds 31, each including a first half mould 310 and a second half mould 311 which are movable along an axis of the mould between a closed configuration, where they are close together and delimit a moulding space 312 in which the object 8 is formed, and an open configuration in which they are spaced apart.

In one specific embodiment illustrated, the first half mould 310 may comprise a central hub 3100 and an outer hub or extractor 3101, surrounding the central hub and movable along the axis of the mould independently of the central hub 3100. The outer hub 3101 is particularly useful for moulding objects 8 which form an undercut. There may also be a drawer 3102, movable along a direction perpendicular to the axis of the mould and configured to facilitate moulding a part of the object 8 such as, for example, a connecting band of a cap configured to join a tamper evident ring to the body of the cap.

The system 1 may also comprise a metering unit 4, configured to separate from the stream of plastic material, predetermined quantities of plastic material forming respective charges 30 to be inserted into corresponding moulds 31 of the plurality of moulds 31.

The moulding machine 3 is preferably a rotary machine; the moulding machine 3 thus includes a carousel. Preferably, the moulding machine 3 includes an upper carousel, comprising a plurality of first half moulds 310, and a lower carousel, rotating together with the upper carousel and comprising a plurality of second half moulds 311 which are movable relative to the corresponding first half moulds 310.

The system may also comprise a transfer device 71, configured to receive the charges 30 from the metering unit 4 and to feed them to the moulding machine 3; more specifically, the transfer device 71 may include a carousel, configured to feed the charges 30 by placing them on the second half moulds 311.

In an embodiment, the transfer device 71 is also configured to withdraw the moulded objects 8 from the moulding machine 3 and to feed them to an outfeed device 72.

In one or more embodiments, the extruder 2 also comprises a pushing device (not illustrated). The pushing device is connected downstream of the cylinder 21 to move the material leaving the outlet 21B of the cylinder 21 and to expel it from the extruder 2. In an embodiment, the pushing device includes a pump which is connected downstream of the outlet 21B of the cylinder 21. In this embodiment, the pushing device is configured to move the thermoplastic or polymeric material leaving the extrusion cylinder continuously; thus, the extruder screw 22 rotates continuously about the longitudinal axis L so that the extrusion cylinder 21 expels material through its outlet 21B continuously. This embodiment is used preferably in extruders configured to feed compression moulding machines 3.

In another embodiment, the pushing device includes a piston that moves with reciprocating motion in a respective cylinder, from a withdrawn position to an advanced position. Inside the cylinder, the piston delimits an injection chamber which is in fluid connection with the outlet 21B of the extrusion cylinder 21. More specifically, the extruder 2 includes a first duct that extends from the outlet 21B of the extrusion cylinder 21, and a second duct that extends from the injection chamber; the first and second ducts merge into an outlet duct configured to expel the molten polymeric material. The extruder screw 22 is rotatable inside the extrusion cylinder 21 about the longitudinal axis L and is also movable by translation along the longitudinal axis L, between a withdrawn position and an advanced position. Initially, the extruder screw 22 is at the withdrawn position and the piston of the pushing device is at the advanced position. As the extruder screw 22 rotates, the extruder screw 22 also moves along the longitudinal axis L from the withdrawn position to the advanced position and, at the same time, the piston of the pushing device moves from the advanced position to the withdrawn position so the material leaving the outlet 21B of the extrusion cylinder 21 invades the injection chamber; at this stage, the material is prevented from flowing into the outlet duct by a valve which blocks its passage. After a predetermined length of time from when the extruder screw 22 starts rotating, the extruder screw 22 is stopped and the piston is moved from the withdrawn position to the advanced position by a specific motor; thus, as the piston moves to the advanced position, it pushes the molten material, which has in the meantime filled the injection chamber, into the outlet duct; at this stage, the valve has been opened and allows the material to flow into the outlet duct; while the piston is moving from the withdrawn position to the advanced position, the extruder screw 22 moves along the longitudinal axis from the advanced position to the withdrawn position; when all the molten material has been expelled, another cycle starts. This embodiment is used in extruders configured to feed injection moulding machines.

The system 1 comprises a processing unit 6. The system 1—that is, the extruder 2—comprises a group of sensors 5; the group of sensors 5 includes a plurality of sensors. The sensors of the group of sensors are configured to capture respective parameters, which may constitute monitoring parameters 52 and/or recipe parameters 51, depending on how they are used by the processing unit 6.

The group of sensors 5 comprises one or more of the following sensors:

- Outlet pressure sensor, configured to measure the pressure of the thermoplastic material at the outlet of the pushing device (where provided); the outlet pressure sensor is connected to an outlet duct which receives the molten material leaving the cylinder 21, downstream of the pushing device (if provided); the outlet pressure sensor is configured to capture the parameter denoted p1 in this disclosure;
- Screw power sensor, configured to measure the electric power absorbed by the electric motor 220 which drives the screw 22; the screw power sensor is connected to the motor 220; the screw power sensor is configured to capture the parameter denoted p2 in this disclosure;
- Screw speed sensor, configured to measure the rotation speed of the screw 22; the screw speed sensor is connected to the screw 22; the screw speed sensor is configured to capture the parameter denoted p3 in this disclosure;
- Heater 26 power sensor, configured to measure the electric power absorbed by the heaters 26; the heater power sensor is connected to the heaters 26; the heater 26 power sensor is configured to capture the parameter denoted p4 in this disclosure;
- Molten material temperature sensor, configured to measure the temperature of the molten polymeric material at the outlet 21B of the cylinder 21 of the extruder 2; the molten material temperature sensor is connected to an outlet duct which receives the molten material leaving the cylinder 21; the molten material temperature sensor is configured to capture the parameter denoted p5 in this disclosure;
- Pushing device power sensor, configured to measure the electric power absorbed by the pushing device (where provided); the pushing device power sensor is connected, in the case where the pushing device comprises a pump, to the motor that drives the pump, and, in the case where the pushing device comprises a piston movable inside a cylinder, to the motor that drives the piston; the pushing device power sensor is configured to capture the parameter denoted p6 in this disclosure;
- Cylinder 21 temperature sensor, configured to measure the temperature of the cylinder 21; the cylinder 21 temperature sensor is connected to the cylinder 21; the cylinder 21 temperature sensor is configured to capture the parameter denoted p7 in this disclosure;
- Pushing device speed sensor, configured to measure the speed at which the pushing device (where provided) moves the molten plastic material; the pushing device speed sensor is connected to the pump in the case where the pushing device comprises a pump, and to the piston in the case where the pushing device comprises a piston movable inside a cylinder; the pushing device speed sensor is configured to capture the parameter denoted p8 in this disclosure;

Inlet pressure sensor, configured to measure the pressure of the molten material at the inlet of the pushing device (where provided); the inlet pressure sensor is connected to a duct which receives the molten material from the outlet 21B of the cylinder 21, upstream of the pushing device (that is, upstream of the pump, in the case where the pump is provided, or upstream of the point of connection between the duct that is connected to the outlet 21B, and the duct that is connected to the injection chamber, in the case where the piston slidable in the cylinder is provided); the inlet pressure sensor is configured to capture the parameter denoted p9 in this disclosure;

Plasticization sensor, configured to capture parameters representing a degree of plasticization inside the cylinder 21 or at the outlet 21B thereof; the plasticization sensor is configured to capture the parameter denoted p10 in this disclosure;

Flow rate sensor for molten plastic material at the outlet 21B of the cylinder 21, configured to measure the flow rate of the plastic material at the outlet 21B of the cylinder 21; for example, the molten plastic material flow rate sensor may be associated with the pushing device (where provided); the flow rate sensor is configured to capture the parameter denoted p11 in this disclosure.

Figure 7:
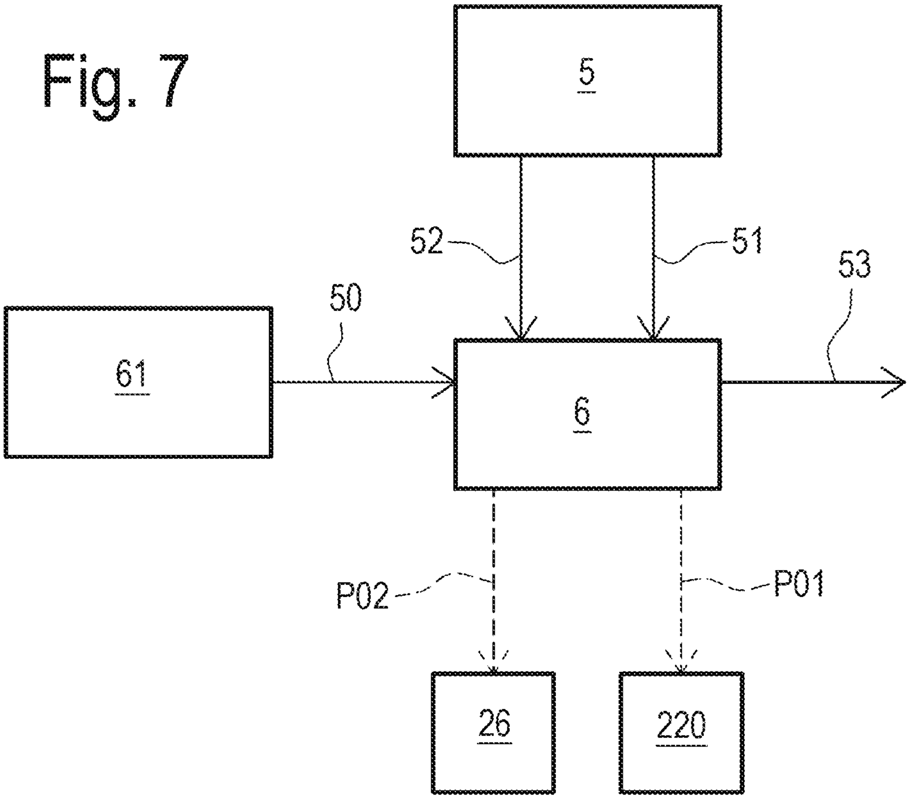
FIG. 7 shows a functional diagram of the processing unit of the extruder of the system of FIG. 1 in one embodiment of it.

The processing unit 6 can work according to a first operating mode. The first operating mode is illustrated by way of example in FIG. 7.

In the first operating mode, the processing unit 6 receives from a memory 61 target values 50 for recipe parameters 51; the recipe parameters 51 are selectable from the parameters denoted p1-p11; preferably, the recipe parameters 51 comprise the temperature of the cylinder 21, the speed of the screw 22 and the pressure at the outlet of the pushing device (if provided). The target values 50 may be saved to the memory 61 by an expert operator, who determines them empirically as a function of product specifications and personal know-how. For example, the product specifications may include a type of the objects 8 to be made, a certain productivity (that is, objects made per hour) and a certain quality required; the productivity and the object type affect the flow rate of the molten plastic material at the outlet; the quality required affects the temperature at the outlet of the extruder and the degree of plasticization. As a function of these specifications and personal know-how, an expert operator can determine target values 50 for recipe parameters 51 such as: temperature of the cylinder 21 (parameter p7), speed of the screw 22 (parameter p3) and/or pressure at the outlet of the pushing device, if provided (parameter p1). The processing unit 6 also receives recipe parameter values 51 measured by the group of sensors 5 and performs a feedback control on the extruder 2 in such a way as to hold the recipe parameter values 51 at the respective target values 50. For example, during the feedback control, the processing unit 6 might act on a first power P01 absorbed by the motor 220 of the screw 22, and/or a second power P02 absorbed by the heaters 26. The processing unit 6 may also receive from the group of sensors 5 monitoring parameters 52, selected from the parameters denoted p1-p11 and may generate alert data 53 as a function of the monitoring parameters 52; for example, if a monitoring parameter 52 undergoes an unusual variation, the processing unit may generate alert data 53 indicating a possible error loading the plastic material into the loading hopper 25. The processing unit 6 can work according to a second operating mode.

Figure 8:
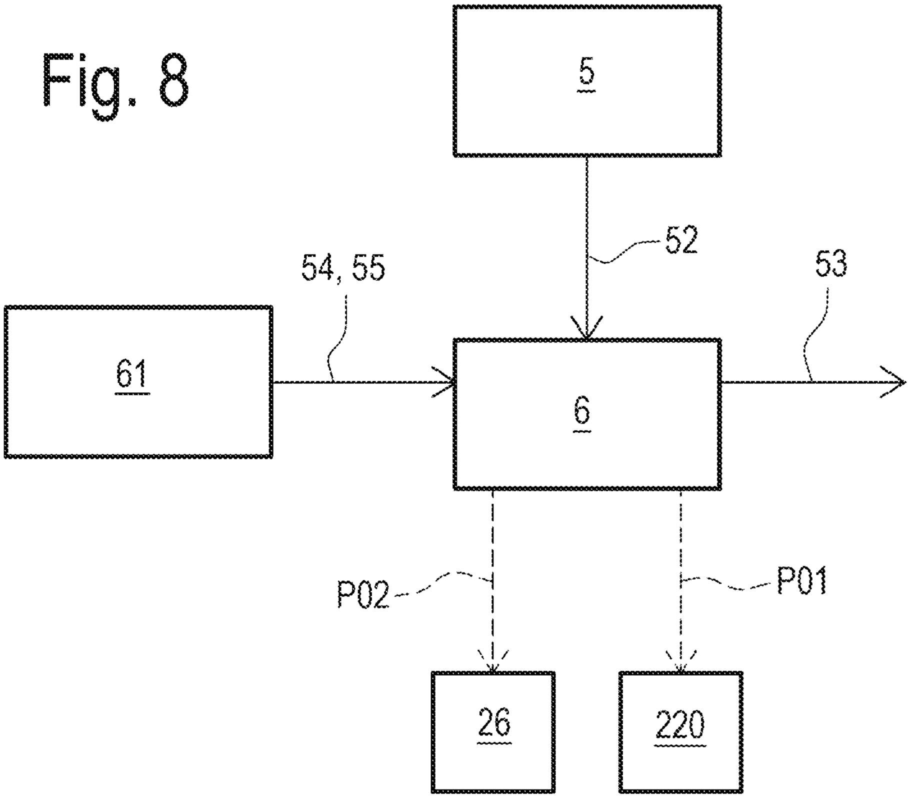
FIG. 8 shows a functional diagram of the processing unit of the extruder of the system of FIG. 1 in another embodiment of it.

The second operating mode is illustrated by way of example in FIG. 8. In the second operating mode, the processing unit 6 receives from a memory 61 the specifications 54 regarding the objects 8 to be made; further, the processing unit 6 is programmed according to specific criteria (or algorithms) 55. The specifications 54 may include a type of the objects 8 to be made, a certain productivity (that is, objects made per hour) and a certain quality required. The criteria 55 may include, for example: a relation between productivity and the flow rate of the molten plastic material; a relation between the quality of the objects 8 and the temperature and degree of plasticization of the molten plastic material (specifically, a low temperature of the molten plastic material promotes good quality, compatibly with an adequate degree of plasticization). In this operating mode, the specifications 54 are processed not by an expert operator but by the processing unit, based on given criteria 55. At a stage preliminary to production, the processing unit 6 acts on certain control parameters (such as the first power P01 absorbed by the motor 220 of the screw 22 and/or the second power P02 absorbed by the heaters 26) to identify a configuration which meets the specifications 54; in effect, the temperature at the outlet of the extruder 2 (which affects the quality of the product 8) depends mainly on the second power P02 absorbed by the heaters 26 (and to a lesser extent, on the friction produced by the rotation of the screw 22 and on the heat loss through the cylinder 21); the flow rate of the plastic material processed (which affects productivity) depends mainly on the first power P01 absorbed by the motor 220 which drives the screw 22. During these operations, the processing unit 6 can use artificial intelligence methods. Further, during the stage preliminary to production, the processing unit may receive monitoring parameters 52 and operate on the control parameters also as a function of the monitoring parameters 52; more specifically, by capturing the monitoring parameters 52, the processing unit 6 checks that the configuration identified effectively meets the specifications 54. Thus, the monitoring parameters 52 are used by the processing unit 6 at the pre-production stage to identify the configuration that meets the specifications 54.

Once the configuration that meets the specifications 54 has been identified, a production stage can begin, during which the processing unit 6 keeps that configuration; to keep it, it may operate on the same control parameters or on other parameters (for example, the monitoring parameters 52) by feedback. In this case, too, during the production stage, the processing unit 6 may receive monitoring parameters 52 measured by the group of sensors 5 and may generate alert data 53 as a function of the monitoring parameters 52.

Figure 9:
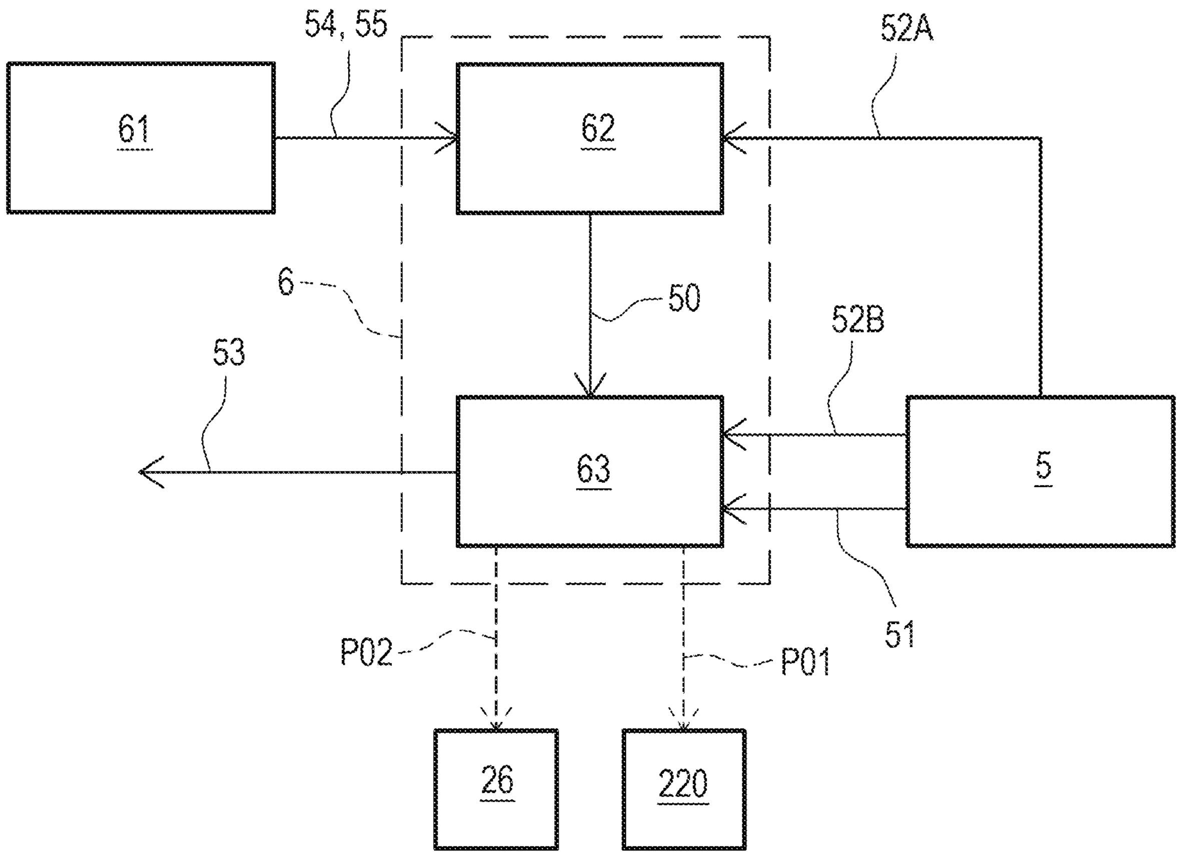
FIG. 9 shows a functional diagram of the processing unit of the extruder of the system of FIG. 1 in another embodiment of it.

The processing unit 6 can work according to a third operating mode. The third operating mode is illustrated by way of example in FIG. 9. In the third operating mode, as in the second operating mode, the processing unit 6 receives from a memory 61 the specifications 54 regarding the objects 8 to be made; further, the processing unit 6 is programmed according to specific criteria (or algorithms) 55. The specifications 54 may include a type of the objects 8 to be made, a certain productivity (that is, objects made per hour) and a certain quality required. The criteria 55 may include, for example: a relation between productivity and the flow rate of the molten plastic material; a relation between the quality of the objects 8 and the temperature and degree of plasticization of the molten plastic material (specifically, a low temperature of the molten plastic material promotes good quality, compatibly with an adequate degree of plasticization). In this operating mode, too, the specifications 54 are processed not by an expert operator but by the processing unit 6, based on given criteria 55. More specifically, the processing unit 6 includes a first module 62 and a second module 63; the first module 62 is used at a stage preliminary to production and the second module 63 is used at the production stage during which the objects 8 are made. In the stage preliminary to production, the first module 62 receives the specifications 54 and derives target values 50 for recipe parameters 51 as a function of the specifications 54 and criteria 55; for example, the target values 50 may be derived through an iterative calculation which continues until the specifications 54 are met. In this case, too, the recipe parameters 51 are selectable from the parameters denoted p1-p11; preferably, the recipe parameters 51 comprise the temperature of the cylinder 21, the speed of the screw 22 and the pressure at the outlet of the pushing device (if provided). Next, during the production stage, the second module 63 receives the derived target values 50 from the first module 62 and the measured recipe parameters 51 from the group of sensors 5; then, in the same way as in the first operating mode, the second module 63 performs a feedback control to hold the recipe parameters 51 at the respective target values 50; more specifically, the second module 63 controls the first power P01 absorbed by the motor 220 of the screw 22 and the second power P02 absorbed by the heaters 26 so as to hold the recipe parameters 51 at the respective target values 50.

Furthermore, at the stage preliminary to production, the first module 62 can receive first monitoring parameters 52A and derive the target values 50 also as a function of the first monitoring parameters 52A; more specifically, by capturing the first monitoring parameters 52A, the first module 62 checks that the target values 50 effectively meet the specifications 54. Thus, the first monitoring parameters 52A are used by the processing unit 6 at the pre-production stage to iteratively derive the target values 50.

During the production stage, the second module 63 can receive second monitoring parameters 52B and can generate alert data 53 as a function of the values adopted by the second monitoring parameters 52B.

The following paragraphs, listed in alphanumeric order for reference, are non-limiting example modes of describing this invention.

A. An extruder (2) for polymeric materials, comprising:

- a cylinder (21), extending along a longitudinal axis (L) and having an inlet (21A) for receiving pellets of polymeric material, and an outlet (21B) for expelling molten polymeric material;
- a screw (22), connected to a motor to drive it in rotation inside the cylinder (21) about the longitudinal axis (L) and to move the polymeric material from the inlet (21A) to the outlet (21B), the motor being connected to the screw (22) to transfer mechanical power to it by absorbing a first power (P1);
- heaters (26), coupled to the extrusion cylinder (21) and configured to transfer thermal power to the cylinder (21) by absorbing a second power (P2);
- a sensor system (5) configured to capture monitoring parameters (52) representing the temperature of the molten plastic material at the outlet (21B) of the cylinder (21);
- a processing unit (6), connected to the sensor system (5).

A1. The extruder according to paragraph A, wherein the processing unit is programmed to adjust the second power (P2) in response to the temperature of the molten plastic material.

A2. The extruder according to paragraph A or A1, wherein the monitoring parameters also represent the temperature of the cylinder (21).

A3. The extruder according to any of the paragraphs from A to A2, wherein the sensor system (5), is configured to capture monitoring parameters (52) representing the flow rate of the molten plastic material at the outlet (21B) of the cylinder (21).

A4. The extruder according to any of the paragraphs from A to A3, wherein the sensor system (5) is configured to measure values of a recipe parameter (51), wherein the processing unit (6) is programmed to store a target value (50) for the recipe parameter and to control the heaters (26) in such a way as to bring the recipe parameter (51) to, and hold it at, the target value (50), and wherein the target value (50) of the recipe parameter is derived by the processing unit (6) on the basis of the adjustment of the second power (P2) and/or specifications relating to objects to be made.

A5. The extruder according to any of the paragraphs from A to A4, wherein the monitoring parameters (52) represent a degree of plasticization of the plastic material inside the cylinder (21) and wherein the processing unit (6) is programmed to adjust the first and/or the second power (P1, P2) in response to the degree of plasticization of the plastic material inside the cylinder (21).

A6. The extruder according to any of the paragraphs from A to A5, wherein the recipe parameters or the monitoring parameters represent a degree of plasticization of the plastic material inside the cylinder and/or the temperature of the molten plastic material at the outlet of the extruder.

A7. The extruder according to any of the paragraphs from A to A6, comprising a pushing device (5), configured to move the molten polymeric material fed by the extruder screw (3) to make it available to a moulding machine for making polymeric objects, wherein the monitoring parameter (52) is based on the pressure of the molten polymeric material measured downstream of the pushing device (5).

A8. The extruder according to any of the paragraphs from A to A7, wherein the screw (22) is a barrier screw defining a feed section (23) and a melting section (24) spaced from each other along the longitudinal axis (L), and wherein the cylinder (21) includes, on an inside surface of it, a groove (27) which extends longitudinally and which faces the melting section (24) of the screw (22).

A8.1. The extruder according to paragraph A8, wherein the groove (27) is helical.

A8.2. The extruder according to paragraph A8 or A8.1, wherein the helical groove (27) is disposed transversely to the thread (222) of the screw (22).

A8.3. The extruder according to any of the paragraphs from A8 to A8.2, wherein the groove (27) comprises a plurality of starts.

A8.4. The extruder according to any of the paragraphs from A8 to A8.3, wherein the groove (27) progressively decreases in depth from the inlet (21A) to the outlet (21B).

A8. The extruder according to any of the paragraphs from A to A8.4, comprising:

- a sensor system (5) configured to measure values of a recipe parameter (51) for the extruder (2);
- a processing unit (6), programmed to store a target value (50) for the recipe parameter and to perform a feedback control on the heaters (26) to bring the recipe parameter (51) to, and hold it at, the target value (50).

A9. The extruder according to any of the paragraphs from A to A8, wherein the sensor system (5) is configured to measure values of a monitoring parameter (52) for the extruder (2), and wherein the processing unit (6) is programmed to process a first value of the monitoring parameter (52), measured at a first time instant, and a second value of the monitoring parameter (52), measured at a second time instant, after the first time instant, and is programmed to generate alert data (53) in response to a comparison between the first and the second value of the monitoring parameter (52).

A10. The extruder according to any of the paragraphs from A8 to A9, comprising a first and a second group of heaters (26) coupled to the cylinder at a first and a second position, respectively, and longitudinally spaced from each other, and wherein the processing unit (6) is connected to the first and the second group of heaters (261, 262) to control them independently of each other.

A11. The extruder according to any of the paragraphs from A to A10, wherein the extruder (2) comprises a motor, connected to the screw to transfer mechanical power to it by absorbing a first power (P1), the heaters (26) are configured to transfer thermal power to the cylinder (21) by absorbing a second power (P2), the extruder (2) comprises a sensor system (5) configured to capture monitoring parameters (52) representing the first power (P1) and the second power (P2), the extruder (2) comprises a processing unit (6) connected to the sensor system (5) and programmed to control the heaters (26) in response to a comparison between the first power (P1) and the second power (P2).

B. A continuous cycle system (1) for moulding single objects from plastic material, comprising:

an extruder according to any of the paragraphs from A to A12, a moulding machine (3) designed to receive the stream of molten plastic material from the extruder (2) and including:

a plurality of moulds (31), each having a first and a second half mould (310, 311), which are movable relative to each other between an open position of the mould (31), to allow extracting the object from the mould, and a closed position of the mould, where they delimit a closed moulding space (312).

B1. The system (1) according to paragraph B, comprising a metering unit (4), configured to separate from the stream of plastic material, predetermined quantities of plastic material forming respective charges to be inserted into corresponding moulds of the plurality of moulds.

B2. The system (1) according to paragraph B or B1, comprising an actuator assembly configured to compress each charge so that it occupies the moulding space (312) of the respective mould (31).

B3. The system (1) according to any of the paragraphs from B to B2, wherein the moulding machine (3) is a compression moulding machine or an injection-compression moulding machine or an injection moulding machine.

B4. The system according to paragraph B3, wherein the first and the second half mould (310, 311) define an undercut when the mould (31) is at the closed position, and the first half mould (310) includes an extractor (3101) which is movable from a retracted position to an extracted position to move the moulded plastic object translationally to facilitate its detachment from the first half mould (310) when the mould (31) is at the open position.

C. A method for extruding polymeric materials by means of a cylinder, which receives pellets of polymeric material at its inlet and is provided with heaters, and a screw, which is connected to a motor which drives it in rotation inside the cylinder to move the polymeric material from the inlet towards an outlet of the cylinder, the method comprising the following steps:

capturing monitoring parameters representing the temperature of the extrusion cylinder and/or the temperature of the molten plastic material at the outlet of the extrusion cylinder;

processing the monitoring parameters and adjusting the temperature of the extrusion cylinder in response to the temperature of the molten plastic material at the outlet of the extrusion cylinder.

C1. The method according to paragraph C, further comprising the following steps:

setting a target value for a recipe parameter;

capturing values for the recipe parameter;

performing a feedback control on the heaters so as to bring the recipe parameter to, and hold it at, the previously stored target value.

The invention claimed is:

1. A continuous cycle system for moulding single objects from plastic material, comprising:

an extruder designed to receive plastic material in raw form and to feed out a stream of plastic material in the liquid phase, the extruder including:

a cylinder extending along a longitudinal axis between an inlet and an outlet;

a screw rotating inside the cylinder about the longitudinal axis, the screw having a core and a thread externally coupled to the core;

heaters coupled to the cylinder;

a compression moulding machine designed to receive the stream of molten plastic material from the extruder and including:

a plurality of moulds, each having a first and a second half mould, which are movable relative to each other between an open position of the mould, to allow extracting the object from the mould, and a closed position of the mould, where they delimit a closed moulding space;

a separator, configured to separate from the stream of plastic material predetermined quantities of plastic material forming respective charges, to be inserted into corresponding moulds of the plurality of moulds;

an actuator assembly, configured to compress each charge so that it occupies the moulding space of the respective mould, wherein the screw of the extruder is a barrier screw defining a feed section and a melting section spaced from each other along the longitudinal axis, and in that the cylinder includes, on an inside surface of it, a groove which extends longitudinally and which faces the melting section of the screw;

one or more sensors configured to measure values of a recipe parameter for the extruder and to measure values of a monitoring parameter for the extruder, wherein the one or more sensors are configured to capture one or more of the following parameters: speed of the extruder screw, extrusion cylinder temperature, temperature of the molten polymeric material;

a processor programmed to store a target value for the recipe parameter and to perform a feedback control on the heaters to bring the recipe parameter to, and hold it at, the target value, the processor is programmed to process a first value of the monitoring parameter, measured at a first time instant, and a second value of the monitoring parameter, measured at a second time instant, after the first time instant, and is programmed to generate alert data in response to a comparison between the first and the second value of the monitoring parameter; and wherein the heaters include a first and a second group of heaters coupled to the cylinder at a first and a second position, respectively, and longitudinally spaced from each other, and wherein the processor is connected to the first and the second group of heaters to control them independently of each other.

2. The system according to claim 1, wherein the groove is helical and is disposed transversely to the thread of the screw.

3. The system according to claim 1, wherein the groove comprises a plurality of starts.

4. The system according to claim 1, wherein the groove progressively decreases in depth from the inlet to the outlet.

5. The system according to claim 1, wherein the one or more sensors are further configured to capture one or more of the following parameters:

an absorbed power of the motor that turns the extruder screw;

an absorbed power of the heaters;

a degree of plasticization inside or at the outlet of the cylinder; and a flow rate of the molten plastic material at the outlet of the cylinder.

6. The system according to claim 1, wherein the extruder comprises a motor, connected to the screw to transfer mechanical power to it by absorbing a first power, the heaters are configured to transfer thermal power to the cylinder by absorbing a second power, the extruder comprises a sensor system configured to capture monitoring parameters representing the first power and the second power, the extruder comprises a processor connected to the sensor system and programmed to control the heaters in response to a comparison between the first power and the second power.

7. The system according to claim 1, wherein the first and the second half mould define an undercut when the mould is at the closed position, and the first half mould includes an extractor which is movable from a retracted position to an extracted position to move the moulded plastic object translationally to facilitate its detachment from the first half mould when the mould is at the open position.

8. The system according to claim 1, wherein the separator is configured to separate a plurality of pasty charges from the stream of material, and a transfer element is configured to pick each pasty charge from the separating element, transport the pasty charge in proximity of said plurality of moulds and place the pasty charge into a correspondent mould of said plurality.

9. The system according to claim 1, wherein the processor is configured to receive specifications regarding the single objects, the specifications including one or more of the following: a type of the objects to be made, a certain productivity and a certain quality required, the processor being programmed to process the specifications according to specific criteria.

10. The system according to claim 9, wherein the processor includes a first module and a second module, the first module is configured to receive the specifications and is programmed to derive target values for recipe parameters as a function of the specifications and criteria, the second module being configured to receive the derived target values from the first module and the measured recipe parameters from the sensors system and to perform a feedback control to hold the recipe parameters at the respective target values.

11. The system according to claim 10, wherein the first module is configured to receive first monitoring parameters and is programmed to derive the target values also as a function of the first monitoring parameters and wherein the second module is configured to receive second monitoring parameters and is programmed to generate alert data as a function of the values adopted by the second monitoring parameters.

12. The system according to claim 10, wherein the first module is programmed to derive target values through an iterative calculation, the recipe parameters being one or more of the following parameters:

speed of the extruder screw;

extrusion cylinder temperature.

13. The system according to claim 12, wherein the extruder comprises a pushing device configured to move the plastic material from the screw to the compression moulding machine, the pushing device includes a pump and a motor configured to drive the pump; and wherein the recipe parameters being one or more of the following parameters:

pressure of the molten polymeric material measured downstream of the pushing device;

absorbed power of the motor that turns the extruder screw;

absorbed power of the heaters;

temperature of the molten polymeric material;

electric power absorbed by the motor of the pushing device;

speed at which the pushing device moves the molten polymeric material;

pressure measured in an inlet zone of the pushing device;

degree of plasticization inside or at the outlet of the cylinder;

flow rate of the molten plastic material at the outlet of the cylinder.

* * * * *